Patented July 17, 1934

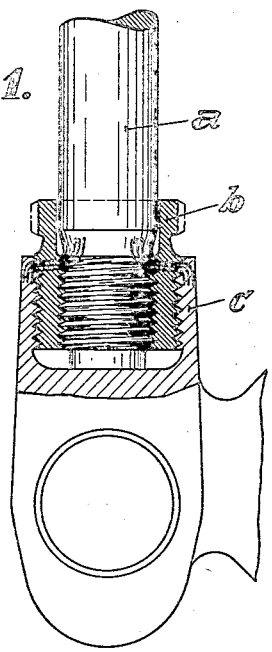
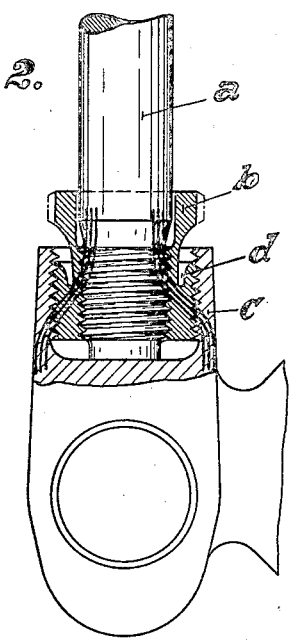
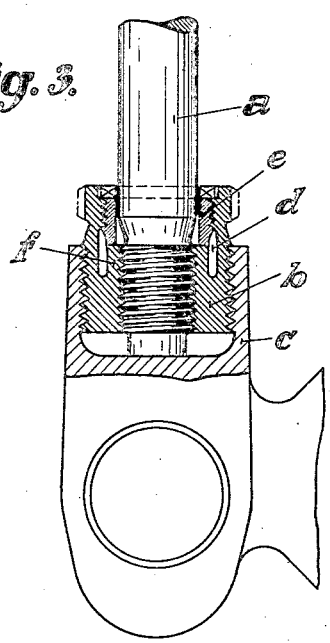
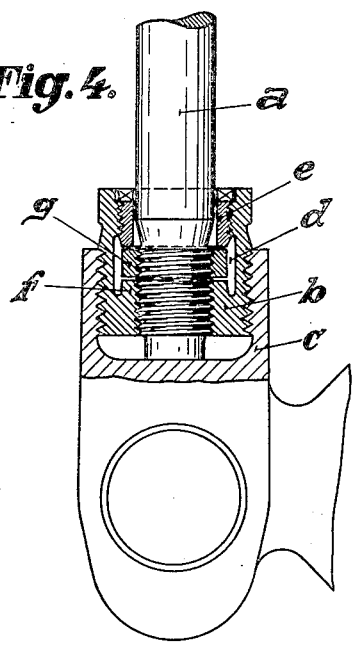

1,967,063

UNITED STATES PATENT OFFICE 1,967,063

PISTON ROD CONNECTION

Gustav Pielstick, Augsburg, Germany, assignor to Maschinenfabrik Augsburg-Nürnberg, A. G., Augsburg, Germany, a corporation of Germany Application March 13, 1933, Serial No. 660,519
In Germany March 17, 1932

5 Claims. (Cl. 287—20)

This invention relates to engines and more particularly to the connection between the piston rod and the cross head of an internal combustion engine or the like.

One object of the invention is the provision of a connection between the end of a rod and a head member, such as the piston rod and cross head of an internal combustion engine, embodying an internally and externally threaded connecting nut so constructed and arranged as to prevent the direct radial passage of forces between the piston rod and the cross head at the location of the inner end threads of the connection between the nut and the piston rod.

Other objects and advantages of the invention will be apparent from the following description, the appended claims and the accompanying drawing, in which—

Fig. 1 is a sectional view of a connection between the piston rod and a cross head, indicating how in a conventional construction the forces travel substantially radially between a piston rod and the cross head at the location of the inner end threads of the piston rod connection;

Fig. 2 is a sectional view of a piston rod and cross head connection embodying the present invention;

Fig. 3 is a sectional view showing a modified form of construction embodying the present invention; and Fig. 4 is a further modification of the present invention.

In conventional connections between a piston rod and a cross head such as shown in Fig. 1 of the drawing, the piston rod $a$ is externally threaded and in threaded engagement with a nut $b$ which is also externally threaded, the external threads of the nut being engaged with cooperating threads provided in the cross head $c$. In such constructions, especially in high speed engines of high power, the piston rod frequently breaks adjacent the end of its threaded connection with the nut, such breaks occurring sometimes after a comparatively short operating period. It has been found that these breaks occur because most of the forces are transmitted between the piston rod and the cross head in a substantially radial direction, the forces being concentrated or localized at the end of the nut or in other words, adjacent the inner end of the threaded connection between the nut and piston rod. As these forces are transmitted in a direction almost transverse to the piston rod axis, the force lines are crowded closely together as diagrammatically represented in Fig. 1, and are caused to take sharp turns in direction. This produces extraordinary strains on the parts, resulting in fatigue of the metal which, in conjunction with the sharp notching effect of the threads, tends to result in piston rod breakage.

In accordance with the present invention, however, the attaching nut $b$, as shown in Fig. 2, is provided with an annular recess $d$ which is so arranged between the internal and external threads of the nut as to interrupt or prevent the direct radial passage of forces between the piston rod and the cross head at the location at the end of the threaded connection between the nut and the piston rod. The lower end of the recess $d$ is located a considerable distance below the inner end threads, and below the upper end of the nut, the recess preferably extending down from a point beyond the end of the cross head. The force lines therefore cannot be transmitted directly radially between the piston rod and the cross head at the end of the threaded connection between the nut and the piston rod, but on the contrary are deflected and required to take a course which has no very sharp bends in direction, and which is not at an excessive angle to the piston rod axis. Moreover the concentration of the force at the location of the end of the internal threads of the nut is appreciably reduced in this way due to the increase of the length of the nut which is effective in its attachment to the piston rod.

The length of the threaded connection between the nut and the piston rod, as shown in Fig. 2, is preferably substantially longer and extends up further along the piston rod than the threaded connection between the nut and the cross head. The latter connection, as will be noted, is considerably shorter than the length of the internal threads of the nut so that the stress lines are further prevented from traveling in a substantially radial direction and are deflected gradually.

In accordance with the construction shown in Fig. 3, the nut $b$ which is threaded on the piston rod $a$ and in threaded engagement with the cross head $c$, is provided with a recess $d$ arranged substantially adjacent the end threads of the connection between the nut and the piston rod. A ring $e$ is provided, with its lower end resting against the end surface of the neck $f$ of the nut, the ring $e$ being externally threaded and held in the upper end of the nut $b$. The ring $e$ can, therefore, hold the piston rod to the cross head even though a break in the piston rod and nut occurs along a line even with the lower end of the recess $d$. The major portion of the nut $b$ would remain attached to the cross head $c$, and the broken neck portion $f$ of the nut would remain connected to the piston rod, but the piston rod will still be held to the cross head by the ring $e$ bearing against the upper surface of the neck $f$.

As shown in the modification of the invention illustrated in Fig. 4, the nut $b$ is internally threaded adjacent its lower end on the end of the piston rod $a$, and is threaded in the cross head. A recess $d$ is provided between the inner and outer threads, extending from a point preferably above the end of the cross head to a point below the end threads of the connection between the nut $b$ and the piston rod $a$. An internally threaded ring $g$ is also in threaded engagement with the piston rod, the lower end of the ring $g$ being preferably spaced some little distance above the upper end of the neck $f$ of the nut. An upper ring $e$ is provided with external threads, in threaded engagement with the upper end of the nut $b$. The lower surface of the upper ring $e$ is preferably slightly spaced from the upper side of the nut $g$. The ring $g$ does not participate in the transmission of forces during normal operation, and neither does the upper ring $e$, but in case of breakage of the piston rod adjacent the first threads of its connection with the nut $b$, or in other words adjacent the top of the neck $f$ of the nut, such as might be caused by unusually large bending strains, the ring $g$ would prevent more than a very slight movement of the piston rod $a$ in an axial direction, and would hold the piston rod connected to the cross head. The ring $g$ would serve as a stop cooperating with the upper ring $e$, and would prevent the piston rod from withdrawing. An arrangement such as this provides a large safety factor against accidental complete breakage of the connection between the piston rod and cross head.

It will be apparent that the forms of the invention as herein set forth provide, in an extremely simple manner, for gradual deflection of the strains or forces, and distributes the force over a considerable area, the recess $d$ in all cases preventing or interrupting the direct radial passage of force between the piston rod and the cross head at the location of the end threads of the connection to the piston rod.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an engine, a piston rod, a cross head, an internally and externally threaded attaching nut threaded on the piston rod and in threaded engagement with the cross head, said nut having an annular recess between its internal and external threads and between the piston rod end and the inner end of the threaded engagement between the piston rod and the nut, the internal and external threads of said nut between the end of the piston rod and the said recess being spaced directly radially at a common axial location.

2. In an engine, a piston rod, a cross head, an internally and externally threaded attaching nut threaded on the piston rod and in threaded engagement with the cross head, said nut having an annular recess between its internal and its external threads and adjacent the inner end threads of the threaded engagement between the piston rod and the nut and terminating between the ends of the threaded engagement of the piston rod and nut, and serving to interrupt the direct radial passage of forces between the piston rod and the cross head at the location of the said inner end threads and require only gradual changes in the direction of forces between the piston rod and the cross head, said internal and external threads having portions located at a common axial location.

3. A piston rod and cross head attachment comprising a piston rod, a cross head, an internally and externally threaded attaching nut threaded on the piston rod and in threaded engagement with the cross head, said nut having an annular recess between its interior and exterior threads and below the upper end of the cross head and extending down past the inner end threads of the threaded engagement of the nut with the piston rod, said recess terminating between the ends of the threaded engagement of the cross head and nut and between the ends of the threaded engagement of the piston rod and nut.

4. In an engine, a piston rod, a cross head, an internally and externally threaded attaching nut threaded on the piston rod and in threaded engagement with the cross head, said nut having an annular recess between its internal and its external threads and adjacent the inner end threads of the threaded engagement between the piston rod and the nut and serving to interrupt the direct radial passage of forces between the piston rod and the cross head at the location of the said inner end threads, and a holding collar in threaded engagement with said nut and encircling the piston rod.

5. In an engine, a piston rod, a cross head, an internally and externally threaded attaching nut threaded on the piston rod and in threaded engagement with the cross head, said nut having an annular recess between its internal and external threads and between the piston rod end and the inner end of the threaded engagement between the piston rod and the nut, a holding collar in threaded engagement with said nut and loosely encircling the piston rod, and an abutment member adapted for abutting engagement with said collar in case of breakage of the piston rod at the end threads thereof and threaded on the rod between said collar and a portion of the nut which is threaded on the piston rod.

GUSTAV PIELSTICK.